United States Patent
Cheng

Patent Number: 5,813,738
Date of Patent: Sep. 29, 1998

[54] FURNITURE COMBINATION

[76] Inventor: Wen Sen Cheng, No. 148-1, Chung San Road, Sa Lu Town, Taichung Hsien, Taiwan

[21] Appl. No.: 879,310
[22] Filed: Jun. 20, 1997
[51] Int. Cl.⁶ ..................................................... A47B 87/00
[52] U.S. Cl. ..................... 312/263; 312/265.5; 312/257.1
[58] Field of Search ............................... 312/263, 257.1, 312/265.5, 108

[56] References Cited

U.S. PATENT DOCUMENTS

| 3,435,575 | 4/1969 | Pottiez | 312/263 X |
| 5,451,102 | 9/1995 | Chuan | 312/263 |
| 5,466,058 | 11/1995 | Chan | 312/263 X |

FOREIGN PATENT DOCUMENTS

| 651787 | 7/1994 | Australia | 312/257.1 |
| 532818 | 3/1993 | European Pat. Off. | 312/265.5 |
| 1164566 | 10/1958 | France | 312/265.5 |
| 1380911 | 10/1964 | France | 312/263 |
| 2596821 | 10/1987 | France | 312/257.1 |
| 2157761 | 5/1973 | Germany | 312/265.5 |
| 3804660 | 8/1989 | Germany | 312/263 |
| 0078807 | 5/1984 | Japan | 312/257.1 |

Primary Examiner—Milton Nelson, Jr.
Assistant Examiner—Hanh V. Tran

[57] ABSTRACT

A furniture device includes two or more plates and two or more panels and one or more boards each having a number of ribs for forming a number of openings. The plates each includes four corner blocks each having a number of helical fins for engaging with fasteners and for allowing the plates and the panels to be assembled together without being damaged. The plates each has a rear side portion having one or more grooves for engaging with the board and for allowing the boards to be secured between the plates without engaging with fasteners.

4 Claims, 7 Drawing Sheets

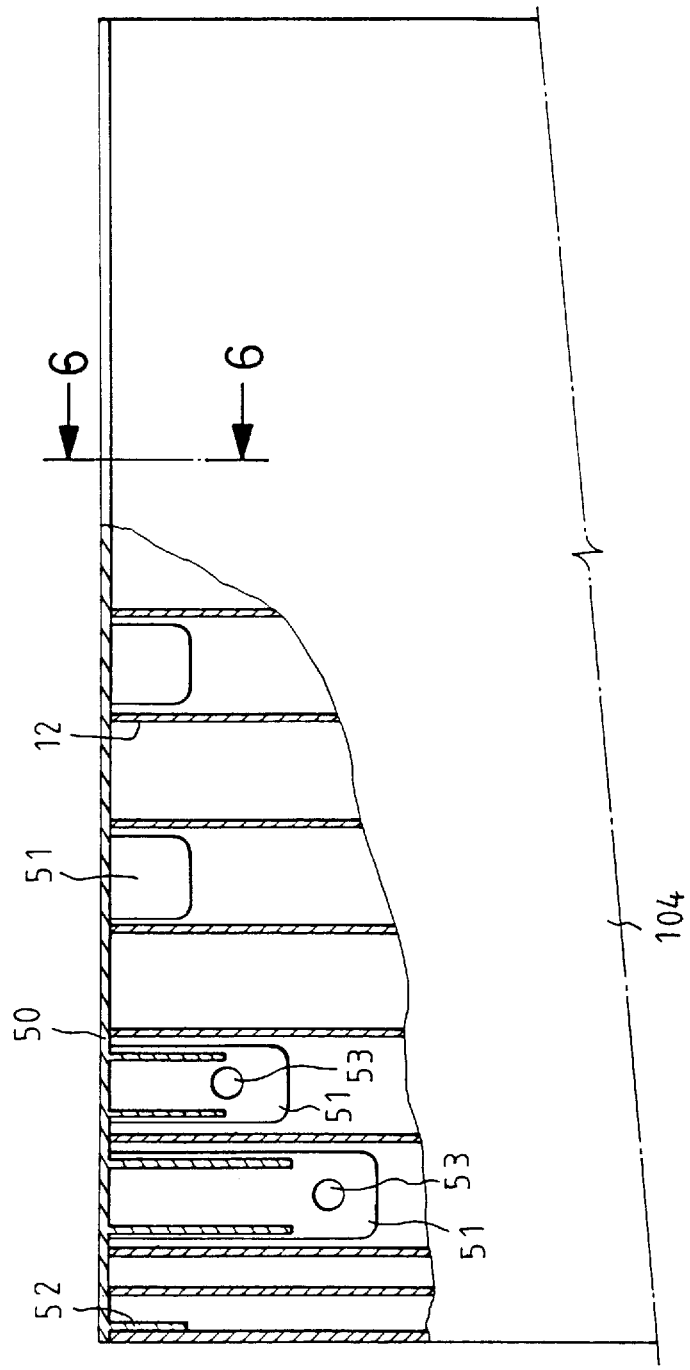

5,813,738

FURNITURE COMBINATION

BACKGROUND OF THE INVENTION

1. Field of the Invention

The present invention relates to a furniture combination and more particularly to a furniture combination that may be easily assembled without being damaged.

2. Description of the Prior Art

Typical furniture facilities comprise a number of plates that are required to be secured together by nails. However, the plates may be easily damaged by the nails if the nails are not hammered well.

The present invention has arisen to mitigate and/or obviate the afore-described disadvantages of the conventional furniture devices.

SUMMARY OF THE INVENTION

The primary objective of the present invention is to provide a furniture combination which may be easily assembled without being damaged.

In accordance with one aspect of the invention, there is provided a furniture combination comprising two or more plates, two or more panels, and one or more boards. The plates and the panels and the boards each includes a number of ribs for defining and for forming a number of openings. The plates each includes four corners each having a block, the blocks each includes a number of helical fins for engaging with fasteners and for allowing the plates and the panels to be secured together without damaging the plates and the panels. The plates each includes a front side portion having an orifice and each includes a rear side portion having one or more grooves for engaging with the board and for allowing the boards to be secured between the plates without engaging with fasteners. The helical fins are provided for engaging with the fasteners and for allowing the furniture combination to be assembled without being damaged.

The plates each includes one or more holes. A door includes an upper portion and a bottom portion each having an orifice, and two pins are engaged with the orifices of the door and engaged with the hole of the plates for pivotally coupling the door to the plates. The door includes a knob for operating the door.

The panels each includes a top portion and a bottom portion each having a number of openings. A number of strips each has a number of ears for engaging with the openings and for allowing the strips to be secured to the panels. The ears each includes a puncture for engaging with fastener. The strips each includes two ends each having a stop for engaging with the panels and for preventing the strips from moving relative to the panels.

Further objectives and advantages of the present invention will become apparent from a careful reading of a detailed description provided hereinbelow, with appropriate reference to accompanying drawings.

BRIEF DESCRIPTION OF THE DRAWINGS

FIG. 5 is a partial plane view of the plate, in which a portion of the plate is cut off for illustrating the interior structure of the plate;

FIG. 6 a cross sectional view taken along lines 6—6 of FIG. 5;

DETAILED DESCRIPTION OF THE PREFERRED EMBODIMENT

Figure 1:
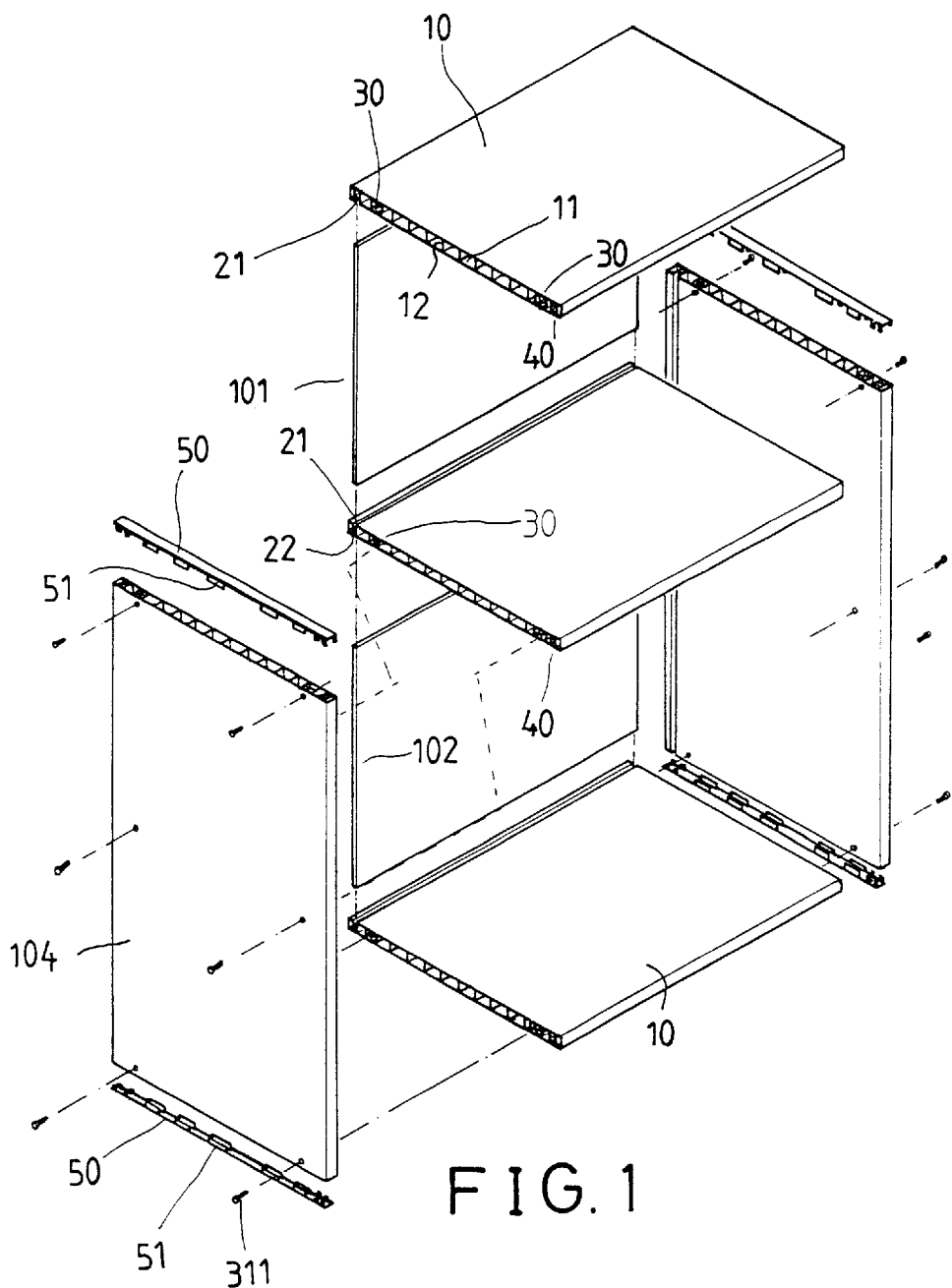
FIG. 1 is an exploded view of the furniture combination in accordance with the present invention.
Figure 2:
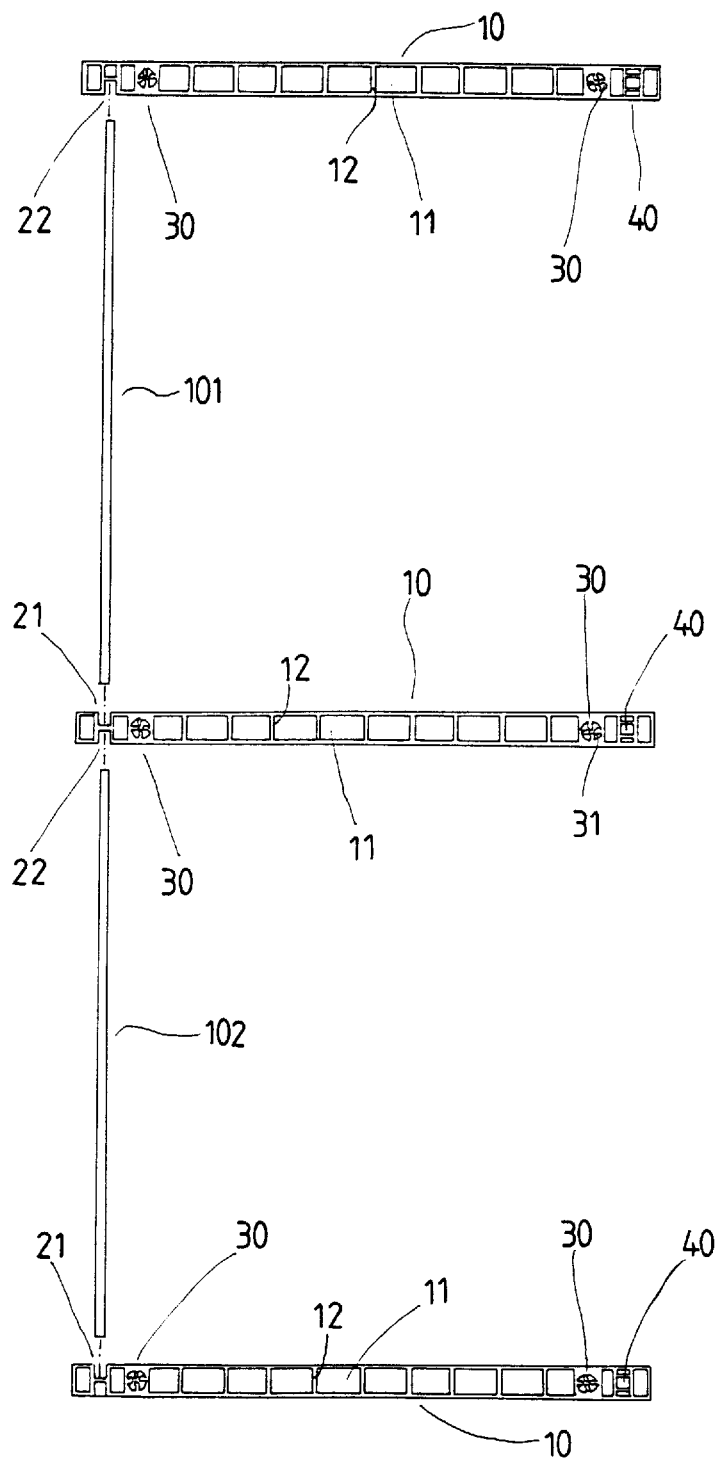
FIG. 2 is a side view of the furniture combination.
Figure 3:
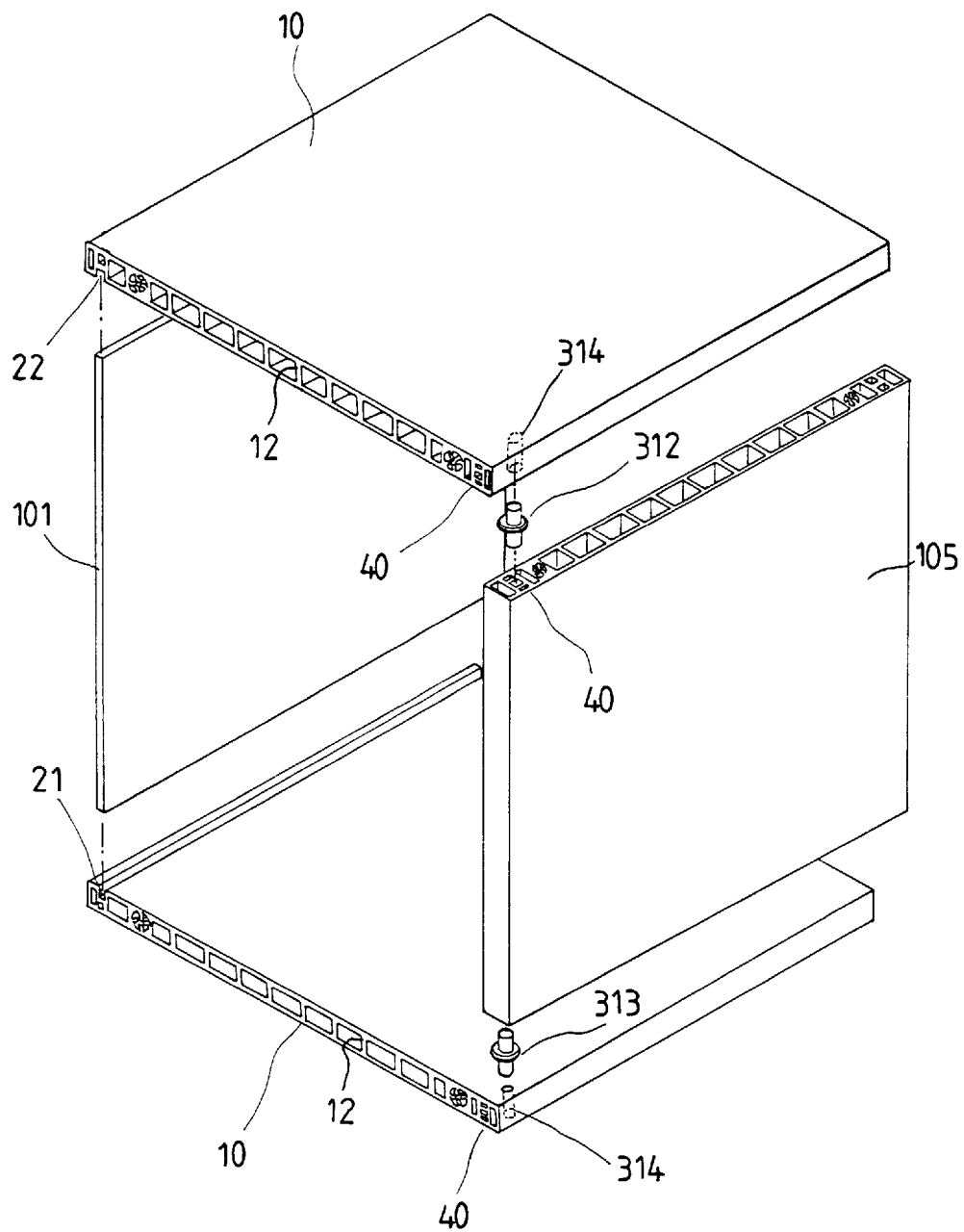
FIGS. 3 and 4 are partial exploded views of the furniture combination.
Figure 4:
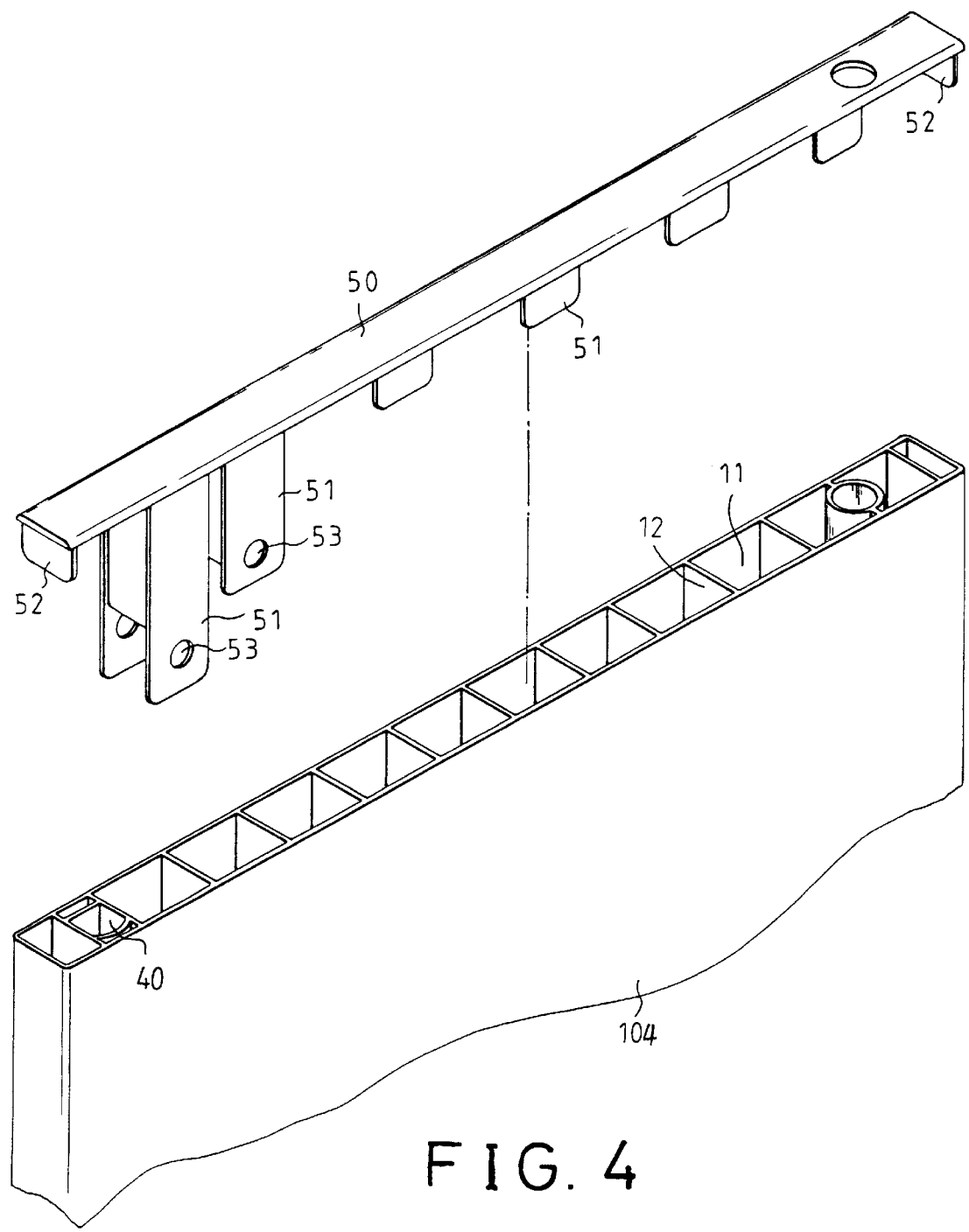

Referring to the drawings, and initially to FIGS. 1 to 3, a furniture combination in accordance with the present invention comprises two or more plates 10 each including a number of ribs 12 formed or secured between the plates 10 so as to form a number of openings 11. The plates 10 each includes four corners each having a block 30 which has one or more fins 31 (FIG. 2) for engaging with screws 311. It is to be noted that the fins 31 are preferably helical for allowing the screws 311 to be secured in place without damaging to the structures of the plates 10. The front side portion of the plate 10 includes an orifice 40 and the rear side portion includes one or two grooves 21, 22 for engaging with the board 101, 102. The board 101, 102 may be secured in place between the plates 10 when the plates 10 are secured to the side panels 104 by screws 311.

As shown in FIGS. 1 and 4–6, a number of strips 50 are provided for engaging on top and bottom of the panels 104 and each includes one or more ears 51 for engaging with the openings 11 and/or the ribs 12 of the panels 104 such that the strips 50 may be used for enclosing the top and bottom portions of the panels 50 and for allowing the panels 50 to include an enclosed top and bottom portions. The ears 51 may include different lengths (FIGS. 4, 5) and may include puncture 53 for engaging with fasteners and for allowing the strips 50 to be further solidly secured to the panels 104. The strips 50 may include two ends each having a stop 52 for engaging with the panels 104 and for preventing the panels 104 from moving laterally relative to the panels 104.

Figure 7:
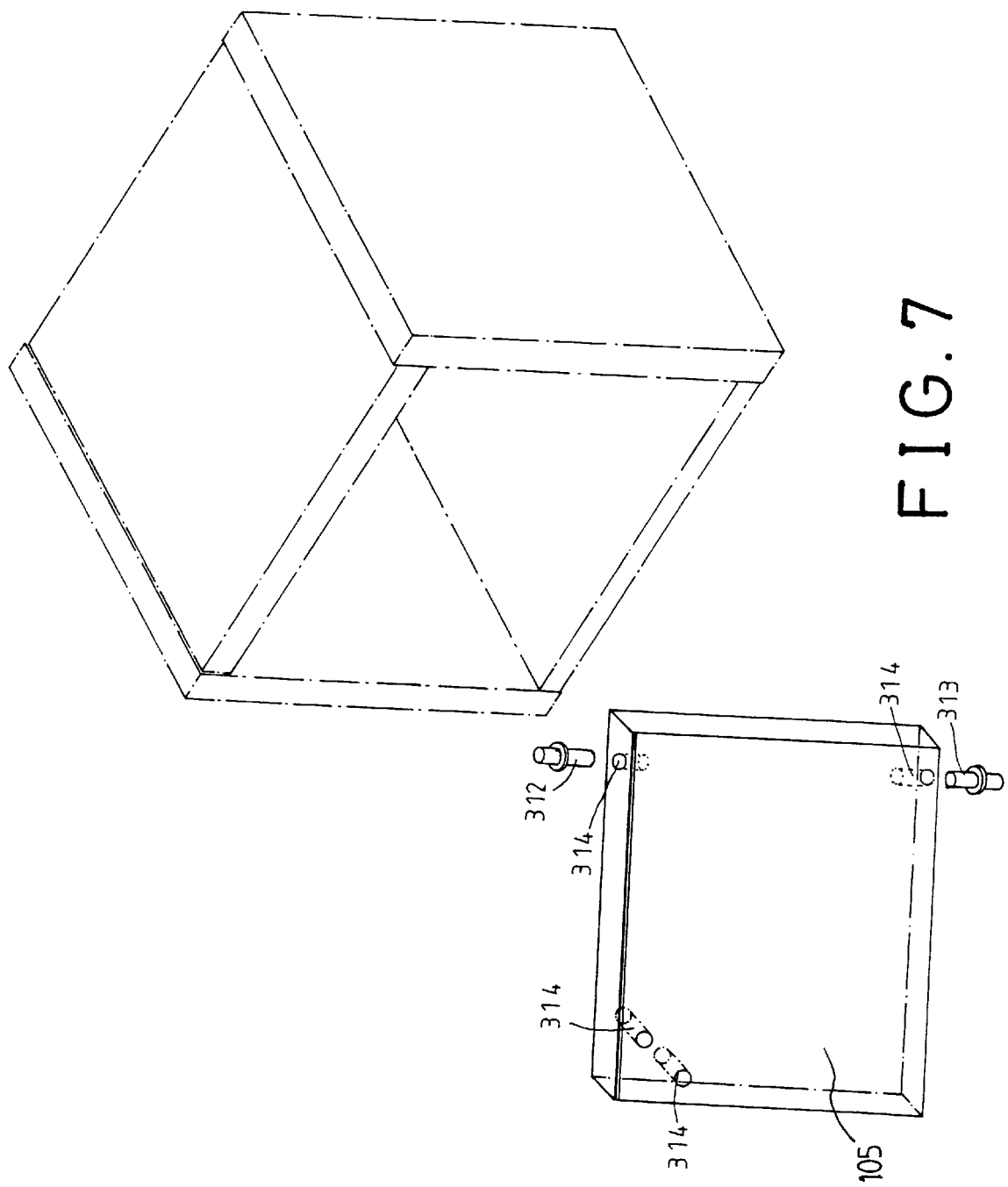
FIG. 7 is a partial exploded view illustrating the application of he furniture combination.
Figure 8:
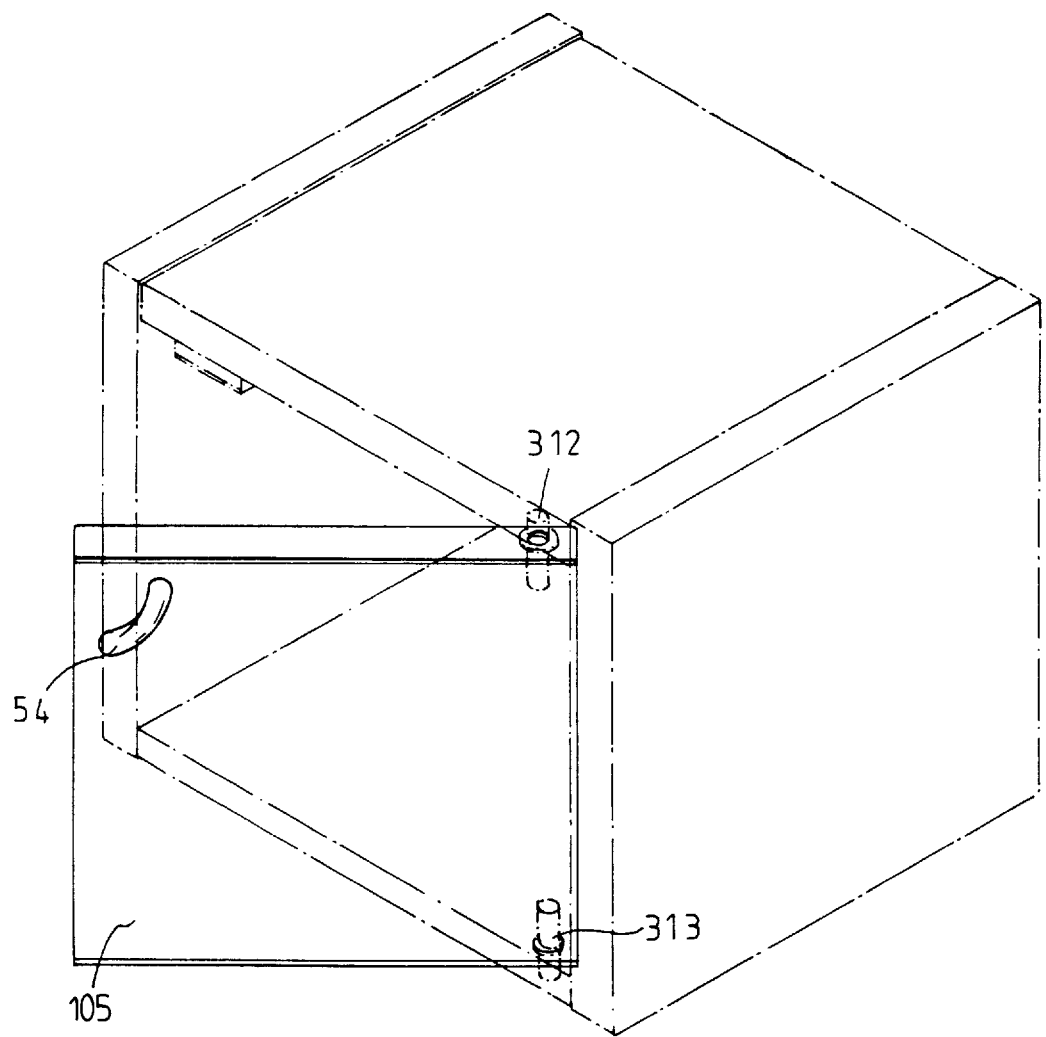
FIG. 8 is a perspective view illustrating the application of the furniture combination.

As shown in FIG. 3, two pins 312, 313 are engaged with the orifices 40 of the door 105 and with the holes 314 of the plates 10 such that the door 105 is rotatable about the pins 312, 313. As shown in FIGS. 7 and 8, the door 105 may also include two holes 314 for engaging with the pins 312 and may include two further holes 314 for securing a knob 54 which may be used for operating the door 105.

It is to be noted that the boards 101, 102 and the door 105 may be easily and quickly secured in place when the plates 10 are secured to the panels 104 by screws 311. In addition, the helical fins 31 of the block 30 may stably secure the screws 311 in place.

Accordingly, the furniture combination in accordance with the present invention may be easily assembled without being damaged.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A furniture combination comprising:

at least two plates, at least two panels, and at least one board, said at least two plates and said at least two panels each including a plurality of ribs for defining and for forming a plurality of openings, said at least two plates each including four corners each having a block, said blocks each including at least one helical fin for engaging with fasteners, said at least two plates each including a front side portion having an orifice and each including a rear side portion having at least one groove for engaging with said board, said at least one helical fin being provided for engaging with the fasteners and for allowing said furniture combination to be assembled without being damaged, said at least two panels each including a top portion and a bottom portion, a plurality of strips for engaging with said top portions and said bottom portions of said at least two panels, said strips each including a plurality of ears for engaging with said openings and for allowing said strips to be secured to said at least two panels, said ears each including a puncture for engaging with a fastener.

2. A furniture combination according to claim 1, wherein said at least two plates each includes at least one hole, said furniture combination further includes a door, said door includes an upper portion and a bottom portion each having an orifice, and two pins engaged with said orifices of said door and engaged with said at least one hole of said at least two plates for pivotally coupling said door to said at least two plates.

3. A furniture combination according to claim 2, wherein said door further includes a knob for operating said door.

4. A furniture combination according to claim 1, wherein said strips each includes two ends each having a stop for engaging with said at least two panels and for preventing said strips from moving relative to said at least two panels.

\* \* \* \* \*